US012692822B2

(12) United States Patent
Lin et al.

(10) Patent No.: US 12,692,822 B2
(45) Date of Patent: Jul. 28, 2026

(54) INTERNALLY HEATED ENGINE

(71) Applicant: HENENG (HAINAN) TECHNOLOGY CO., LTD, Hainan (CN)

(72) Inventors: Muze Lin, Beijing (CN); Heyuan Lin, Beijing (CN); Hefei Lin, Beijing (CN)

(73) Assignee: HENENG (HAINAN) TECHNOLOGY CO., LTD, Hainan (CN)

( * ) Notice: Subject to any disclaimer, the term of this patent is extended or adjusted under 35 U.S.C. 154(b) by 110 days.

(21) Appl. No.: 18/832,676

(22) PCT Filed: Nov. 15, 2022

(86) PCT No.: PCT/CN2022/131924
§ 371 (c)(1),
(2) Date: Feb. 7, 2025

(87) PCT Pub. No.: WO2024/092877
PCT Pub. Date: May 10, 2024

(65) Prior Publication Data
US 2025/0179972 A1 Jun. 5, 2025

(30) Foreign Application Priority Data
Nov. 4, 2022 (CN) ......................... 202211373525.0

(51) Int. Cl.
*F02G 1/05* (2006.01)
*F02G 1/055* (2006.01)

(52) U.S. Cl.
CPC .................................... *F02G 1/055* (2013.01)

(58) Field of Classification Search
CPC ........ F02G 1/053; F02G 1/0535; F02G 1/043; F02G 2270/55; F02G 2258/00; F02G 2270/30; F02G 2243/06; F02G 2243/02; F02G 2253/04
See application file for complete search history.

(56) References Cited

U.S. PATENT DOCUMENTS 9,777,669 B2 * 10/2017 Lynn ....................... F01K 11/04
2014/0238012 A1 * 8/2014 Miller ..................... F02G 1/043 60/517
2016/0010588 A1 * 1/2016 Ge ............................ F02G 5/04 60/597
(Continued)

FOREIGN PATENT DOCUMENTS

CN 1408051 A 4/2003
CN 102536367 A 7/2012
(Continued)

OTHER PUBLICATIONS

English Translation CN-106837595-A (Year: 2017).*
(Continued)

*Primary Examiner* — Shafiq Mian
(74) *Attorney, Agent, or Firm* — ARC IP Law, PC; Joseph J. Mayo

(57) ABSTRACT

An internally heated engine, which comprises a Stirling engine and heating facilities. The internally heated engine, by means of altering a means of external heating of the Stirling engine, is provided with the heating facilities in a hot cylinder to push a piston to output power.

3 Claims, 1 Drawing Sheet

(56) References Cited

U.S. PATENT DOCUMENTS

| | | | | |
|---|---|---|---|---|
| 2016/0102631 A1* | 4/2016 | Lynn | F01K 11/04 60/517 |
| 2021/0003094 A1* | 1/2021 | Mastonstråle | F02G 1/053 |
| 2025/0179972 A1* | 6/2025 | Lin | F02G 1/043 |

FOREIGN PATENT DOCUMENTS

| | | | | |
|---|---|---|---|---|
| CN | 202732151 U | 2/2013 | | |
| CN | 105065114 A | * 11/2015 | | |
| CN | 106837595 A | * 6/2017 | F27D 17/10 | |
| CN | 108730068 A | 11/2018 | | |

OTHER PUBLICATIONS

English Translation CN-105065114-A (Year: 2015).*
International Search Report issued in PCT/CN2022/131924 on Nov. 27, 2022, and English Translation thereof.
First Office Action issued in CN202211373525.0 on Jul. 7, 2023, and English Translation thereof.
Second Office Action issued in CN202211373525.0 on Sep. 10, 2023, and English Translation thereof.
Third Office Action issued in CN202211373525.0 on Oct. 14, 2023, and English Translation thereof.

* cited by examiner

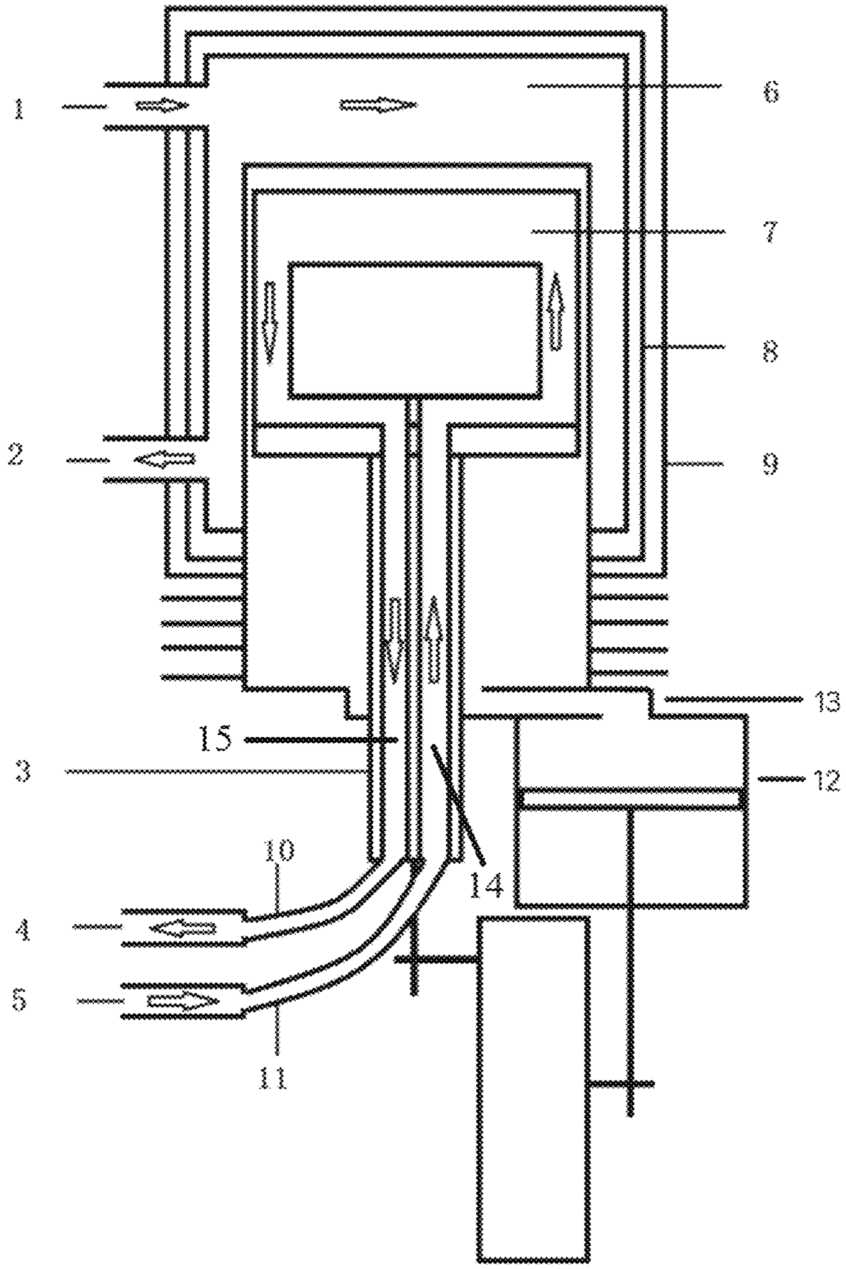
1
2
3
4
5
6
7
8
9
10
11
12
13
14
15

INTERNALLY HEATED ENGINE

CROSS-REFERENCE TO RELATED APPLICATION

This application is a national stage application of International Patent Application No. PCT/CN2022/131924, filed Nov. 15, 2022, which claims priority of the Chinese Patent Application No. 202211373525.0, filed on Nov. 4, 2022, both of which are incorporated by references in their entities.

BACKGROUND OF THE INVENTION

Field of the Invention

At least one embodiment of the invention belongs to the technical fields of energy saving and emission reduction, and specifically relates to an internally heated engine.

Description of the Related Art

The Stirling engine was invented by British physicist Robert Stirling in 1816. It is an external combustion engine. Its basic working principle involves a closed working medium (such as hydrogen, helium, or air) flowing back and forth between a hot cylinder, a cold cylinder, and a regenerator, outputting power through a Stirling cycle consisting of four processes: cooling, compression, heat absorption, and expansion. A typical Stirling engine comprises the following core components: a hot cylinder, which is a cavity where the working medium expands when heated to push a power piston to perform work; a cold cylinder, which is a cavity where the working medium is cooled and compressed; and a regenerator, which is a regenerative heat exchanger connecting the hot cylinder and the cold cylinder, recovering and releasing heat when the working medium flows back and forth. The regenerator is a key component for improving the efficiency of the Stirling cycle.

Traditional Stirling engines employ an external heating method. Their heat source (such as combustion flame, industrial waste gas, or solar energy) is located outside the engine, heating the cylinder wall of the hot cylinder through an external heater. Heat must pass through the cylinder wall to be conducted to the internal working medium, causing it to expand and perform work. This design of external combustion with a closed working medium gives it the following advantages: firstly, it is suitable for various energy sources and fuels, especially suitable for utilizing dispersed industrial waste heat; secondly, it operates with low noise; thirdly, its performance is not affected by external atmospheric pressure. However, this structure also brings significant disadvantages: firstly, heat needs to be conducted through the cylinder wall, resulting in significant thermal resistance and heat loss, making it difficult to improve thermal efficiency; secondly, to transfer sufficient heat, the external heater and heat exchange structure often lead to a large engine volume with relatively low output power; thirdly, due to thermal inertia and the long thermal conduction path, engine starting and response speeds are slow. Currently, Stirling engines have small-scale applications in fields such as aerospace, marine energy, and solar power generation. However, due to the aforementioned inherent drawbacks, their large-scale promotion and efficient utilization of industrial waste heat and engine exhaust waste heat are not ideal.

BRIEF SUMMARY OF THE INVENTION

The purpose of at least one embodiment of the invention is to convert heat energy with reduced carbon emission into electric energy. An internally heated engine is provided by changing an external heating method of the Stirling engine. By fundamentally changing the external heating method of the Stirling engine, heating devices are directly arranged inside the hot cylinder of the engine, thereby improving thermal efficiency, reducing heat loss, increasing power density, and shortening starting time.

In one or more embodiments, all advantages of the Stirling engine are reserved, and the disadvantages of large heat loss, low power, low thermal efficiency, and slow starting are improved. An engine capable of heating and working in a hot cylinder is provided. By changing an external heating method of the Stirling engine, a fixed heating facility is arranged in the hot cylinder, and a heating facility is arranged on a movable piston. During starting, both the fixed heating facility and the movable piston heating facility in the hot cylinder are configured for heating, and heat is dissipated to push the piston to output power. Power is output through a cycle of cooling, compression, heat absorption, and expansion in the cylinder. The piston of the current Stirling engine is usually insulated by means of multiple hollow interlayers, which can not be heated and results in heat loss. In at least one embodiment, by heating the piston, a heating area in the hot cylinder is increased, compared with the Stirling engines with similar volumes, more heat can be obtained and higher power can be generated. A thermal insulation device is arranged in the hot cylinder, so the heat loss can be reduced. Due to two-way simultaneous heating, the heating speed is high, and the starting time can also be shortened.

The purpose of at least one embodiment of the invention is to make full use of industrial waste heat and engine exhaust waste heat to be introduced into the fixed heating facility and the movable piston heating facility of the engine, and in the hot cylinder, the piston is heated and pushed to drive the engine to output power. In burning devices arranged in the fixed heating facility and the movable piston heating facility in the hot cylinder, multiple fuels are burned and heated, so that the engine is driven to operate.

Compared with the prior art, the advantageous effects of the present disclosure are as follows:

1. Significantly improved heating efficiency and power density: The pistons of existing Stirling engines usually adopt multi-layer hollow interlayer structures for thermal insulation, which not only cannot be actively heated but also cause heat loss themselves. The present disclosure actively heats the piston, which is equivalent to adding a large, movable heating surface inside the hot cylinder. Compared with traditional Stirling engines of similar volume, the present disclosure can obtain and utilize more heat inside the hot cylinder, thereby generating higher power.

2. Significantly reduced heat loss: The present disclosure can arrange a thermal insulation layer on the outside of the hot cylinder. Since the heat source is already inside the cylinder, the insulation layer can effectively prevent heat from dissipating outward. This is fundamentally different from the requirement for efficient heat conduction through the cylinder wall in traditional Stirling engines.

3. Accelerated starting speed: The fixed heating facility and the movable piston heating facility can work simultaneously or independently, achieving two-way or multi-point simultaneous heating. This causes the working medium inside the hot cylinder to heat up very quickly, thereby significantly shortening the engine's starting time.

4. Full utilization of energy: The heating facilities of the present disclosure can directly introduce industrial waste heat or engine exhaust waste heat as heat sources, or can arrange burning devices inside them to directly burn multiple fuels. This enables the present disclosure to serve both as an efficient waste heat recovery device and as an active power source using multiple fuels, achieving cascaded energy use and carbon emission reduction.

BRIEF DESCRIPTION OF THE DRAWINGS

FIG. 1 is a schematic diagram of an internally heated engine, according to one or more embodiments of the invention.

Reference signs: 1, first input port; 2, first output port; 3, piston connecting rod; 4, second output port; 5, second input port; 6, fixed heating facility; 7, piston heating facility; 8, thermal insulation layer; 9, external cylinder of hot cylinder; 10, output connection hose; 11, input connection hose; 12, cold cylinder; 13, regenerator; 14, input channel; and 15, output channel.

DETAILED DESCRIPTION OF THE INVENTION

The embodiments of the present disclosure are described in detail below in conjunction with the drawings. These embodiments are implemented based on the technical solutions of the present disclosure, but the protection scope of the present disclosure is not limited to the following embodiments.

At least one embodiment of the invention provides an internally heated engine, comprising a Stirling engine and heating devices, wherein the Stirling engine is an engine in which the heating devices are arranged in a hot cylinder;

and the heating devices include a movable heating device and/or a fixed heating device arranged in the hot cylinder.

Industrial waste heat and engine exhaust waste heat are utilized and input into the engine as heat sources. One or more engines can be arranged in series through temperature lapse to achieve an expected ideal discharge temperature. Not only the carbon emission is reduced, but also electricity can be generated without consuming energy. The methods are the best implementation. The methods are as follows.

The first method is as follows. A heat source enters a fixed heating device 6 through an input port 1, and heat is dissipated and discharged through an output port 2. Meanwhile, the heat source enters a piston heating facility 7 through an input port 5, an input connection hose 11, and an input channel arranged inside a piston connecting rod 3. Heat is dissipated and discharged from an output port 4 through an output channel inside the piston connecting rod 3 and an output connection hose 10. Both the fixed heating facility 6 and the piston heating facility 7 are configured for heating to push a piston to output power.

The second method is as follows. The second method can be used for multiple fuels. Fuels and oxygen enter the fixed heating device 6 through the input port 1. A burning facility is arranged at the fixed heating facility 6. Fuels and oxygen are burned, and heat is dissipated and discharged through the output port 2. Meanwhile, fuels and oxygen enter the piston heating facility 7 through the input port 5, the input connection hose 11, and the input channel arranged inside the piston connecting rod 3. A burning device is arranged at the piston heating facility 7. Fuels and oxygen are burned, and heat is dissipated and discharged from the output port 4 through the output channel inside the piston connecting rod 3 and the output connection hose 10. Both the fixed heating facility 6 and the piston heating facility 7 are configured for heating to push the piston to output power.

The above embodiments are only used to illustrate the technical solutions of the present disclosure and not to limit them. Although the present disclosure has been described in detail with reference to the foregoing embodiments, those skilled in the art can still modify the technical solutions described in the foregoing embodiments or equivalently replace some of the technical features. Any modifications, equivalent replacements, improvements, etc., made within the spirit and principle of the present disclosure shall be included within the protection scope of the present disclosure.

What is claimed is:

1. An internally heated engine, comprising:

a hot cylinder assembly, a cold cylinder, and a regenerator;

wherein the hot cylinder assembly comprises a hot cylinder body and a heating device integrated inside the hot cylinder body, the hot cylinder body being configured as a cavity for containing a working medium, the cold cylinder is configured as a cavity for cooling and compressing the working medium, the regenerator connects the hot cylinder assembly and the cold cylinder, and is configured to store and release heat when the working medium reciprocates between the hot cylinder assembly and the cold cylinder; and wherein the heating device comprises at least one piston heating facility arranged inside a piston, the at least one piston heating facility being integrated inside the piston that reciprocates within the hot cylinder body, and the at least one piston heating facility being configured to generate heat and transfer the heat that is generated to the piston, such that the piston serves as an active heating surface to transfer heat to the working medium inside the hot cylinder body, thereby driving the piston to move and output power.

2. The internally heated engine according to claim 1, wherein the heating device further comprises a fixed heating facility, the fixed heating facility being arranged inside the hot cylinder body and outside a movement stroke of the piston, the fixed heating facility being configured to generate heat and transfer the heat that is generated to the working medium inside the hot cylinder body.

3. The internally heated engine according to claim 1, wherein the hot cylinder assembly further comprises a piston connecting rod, an input channel and an output channel are arranged inside the piston connecting rod, the input channel is configured to input a heat source or fuels and oxygen to the at least one piston heating facility inside the piston, and the output channel is configured to output the heat source or the fuels and oxygen after being dissipated or combusted.

* * * * *